United States Patent
Bauer

(10) Patent No.: US 11,988,778 B2
(45) Date of Patent: May 21, 2024

(54) DETERMINING A LOCATION OF A TRANSMITTER DEVICE

(71) Applicant: Nicholaus J. Bauer, Seattle, WA (US)

(72) Inventor: Nicholaus J. Bauer, Seattle, WA (US)

(*) Notice: Subject to any disclaimer, the term of this patent is extended or adjusted under 35 U.S.C. 154(b) by 0 days.

(21) Appl. No.: 17/838,760

(22) Filed: Jun. 13, 2022

(65) Prior Publication Data

US 2022/0317268 A1 Oct. 6, 2022

Related U.S. Application Data

(60) Division of application No. 17/019,558, filed on Sep. 14, 2020, now Pat. No. 11,360,195, which is a division of application No. 15/947,045, filed on Apr. 6, 2018, now Pat. No. 10,775,475, which is a continuation of application No. 15/090,956, filed on Apr. 5, 2016, now Pat. No. 9,939,517.

(51) Int. Cl.
| | |
|---|---|
| *G01S 7/4865* | (2020.01) |
| *G01S 5/00* | (2006.01) |
| *G01S 5/02* | (2010.01) |
| *G01S 5/14* | (2006.01) |
| *H04W 64/00* | (2009.01) |

(52) U.S. Cl.
CPC .......... *G01S 7/4865* (2013.01); *G01S 5/0081* (2013.01); *G01S 5/0221* (2013.01); *G01S 5/0252* (2013.01); *G01S 5/14* (2013.01); *H04W 64/00* (2013.01)

(58) Field of Classification Search
CPC ........ G01S 5/0081; G01S 5/0252; G01S 5/14; G01S 1/66; G01S 5/02528; G01S 5/0273; G01S 5/08; G01S 1/68; G01S 5/02521; H04W 4/025; H04W 64/006; H04W 24/00; H04W 64/00; H04W 88/08
See application file for complete search history.

(56) References Cited

U.S. PATENT DOCUMENTS

| | | |
|---|---|---|
| 6,201,470 B1 | 3/2001 | Withington |
| 6,300,904 B1 | 10/2001 | Dvorak et al. |

(Continued)

FOREIGN PATENT DOCUMENTS

| | | | |
|---|---|---|---|
| CN | 102209386 A | * 10/2011 | |
| WO | WO-2015027118 A1 | * 2/2015 | ............... G01S 1/66 |

OTHER PUBLICATIONS

Non-Final Office Action dated Apr. 12, 2017 for U.S. Appl. No. 15/090,956.

*Primary Examiner* — Matthew C Sams
(74) *Attorney, Agent, or Firm* — Fleit Intellectual Property Law; Thomas S. Grzesik

(57) ABSTRACT

Various embodiments determine a position of a wireless device and enable the wireless device to retrieve the determined location. In one embodiment, a system comprises of at least one wireless transmitting device, a plurality of wireless receivers, and at least one server. Each of the plurality of wireless devices receive signals from the wireless transmitting device with unknown position and send time stamped information to the server. Each of the plurality of wireless device also sends unique identifying information about the wireless transmitting device. The server calculates a position of the wireless transmitting device by considering the inputs received from the plurality of wireless receivers. The wireless device obtains its position from the server. The process can be executed on demand or at regular frequent intervals.

8 Claims, 9 Drawing Sheets

(56) References Cited

U.S. PATENT DOCUMENTS

| | | |
|---|---|---|
| 6,317,386 B1 | 11/2001 | Ward |
| 8,604,909 B1 | 12/2013 | Amir et al. |
| 9,625,567 B2 | 4/2017 | Lim |
| 9,939,517 B2 | 4/2018 | Bauer |
| 10,775,475 B2 | 9/2020 | Bauer |
| 10,897,686 B2 | 1/2021 | Do et al. |
| 2002/0037732 A1 | 3/2002 | Gous et al. |
| 2003/0125044 A1 | 7/2003 | Deloach, Jr. et al. |
| 2005/0192024 A1* | 9/2005 | Sheynblat ............... G01S 19/46 455/456.1 |
| 2008/0169979 A1 | 7/2008 | de Salas |
| 2009/0257426 A1 | 10/2009 | Hart et al. |
| 2009/0276542 A1 | 11/2009 | Aweya et al. |
| 2010/0039929 A1* | 2/2010 | Cho ..................... G01S 5/02521 370/254 |
| 2010/0265093 A1* | 10/2010 | Cho ..................... G01S 5/02528 340/8.1 |
| 2011/0028166 A1 | 2/2011 | Ketchum et al. |
| 2011/0286437 A1* | 11/2011 | Austin ..................... H04W 4/02 370/338 |
| 2013/0072216 A1* | 3/2013 | Ledlie .................... H04W 4/029 455/456.1 |
| 2013/0288711 A1 | 10/2013 | Meredith et al. |
| 2014/0185520 A1 | 7/2014 | Gao et al. |
| 2014/0192622 A1 | 7/2014 | Rowe et al. |
| 2014/0213294 A1* | 7/2014 | Marti .................... H04W 4/021 455/456.2 |
| 2014/0369169 A1 | 12/2014 | Iida et al. |
| 2015/0133173 A1* | 5/2015 | Edge ......................... G01S 5/08 455/456.6 |
| 2015/0235050 A1* | 8/2015 | Wouhaybi ............. G06F 16/955 726/28 |
| 2015/0341894 A1* | 11/2015 | Rowitch ............. H04W 64/003 455/456.1 |
| 2016/0088429 A1 | 3/2016 | Gao et al. |
| 2016/0202078 A1* | 7/2016 | Scalisi ............... G01C 21/3667 701/519 |
| 2016/0323705 A1* | 11/2016 | Murphy ................ G01S 5/0294 |
| 2017/0336494 A1* | 11/2017 | Han ......................... G01S 5/30 |
| 2018/0199149 A1* | 7/2018 | Mallya .................. G01S 5/0226 |
| 2019/0191407 A1* | 6/2019 | Wang ..................... H04W 8/02 |

\* cited by examiner

DETERMINING A LOCATION OF A TRANSMITTER DEVICE

BACKGROUND

The present disclosure generally relates to device positioning environments, and more particularly relates to determining the location of a wireless communication device based on reception of wireless signals transmitted by the device.

Wireless communication devices such as smart phones offer a wide range of functions to its users. One such function is a positioning capability that determines the location of the device. However, most devices require a signal from a Global Positioning System (GPS) to present location information to a user. Current technology deployed within consumer wireless communication devices generally fails to provide reliable acquisition of GPS signals while indoors. In addition, this technology and other technologies implemented outside of consumer wireless communication devices generally fail to provide a high-degree of accuracy with respect to a device's location.

BRIEF SUMMARY

One or more embodiments provide a highly accurate and reliable device positioning system to provide location data to a user's wireless communication device while indoors or outdoors. The location data not only comprises latitude and longitude coordinates but also comprises altitude data as well. Embodiments of the present disclosure improve accuracy over existing technologies in several ways. Firstly, one or more embodiments do not rely on Received Signal Strength Indicators (RSSI), which change in a dynamic system. These embodiments utilize time of arrival (TOA) (or time difference of arrival (TDOA)) of radio frequency (RF) transmissions, which is constant or nearly constant on earth. One or more embodiments also provide device hardware capable of measuring samples at a rate of near 1 nanosecond or better. This allows location data accuracy close to 1 ft or better, where most conventional systems are only capable of 10 s of feet.

In one embodiment, a method with a server system for determining a position of a portable electronic device is disclosed. The method comprises obtaining a set of data packets from a plurality of wireless nodes, wherein each data packet in the set of data packets is associated with a positioning request from a portable electronic device. A time stamp and time offset information for each data packet in the set of data packets are obtained. The time stamp is generated by a respective wireless node in the plurality of wireless nodes in response to receiving the positioning request from the portable electronic device. The time offset is associated with processing the positioning request by the wireless node. A normalized time stamp is generated for each time stamp in the set of time stamps based on the time offset information associated with each time stamp. A location of the portable electronic device is determined based on each of the normalized time stamps and known position of each wireless node in the plurality of wireless nodes.

In another embodiment, a non-transitory computer program product for determining a position of a portable electronic device is disclosed. The non-transitory computer program product comprises a computer readable storage medium having computer readable program code embodied therewith. The computer readable program code configured to perform a method. The method comprises obtaining a set of data packets from a plurality of wireless nodes, wherein each data packet in the set of data packets is associated with a positioning request from a portable electronic device. A time stamp and time offset information for each data packet in the set of data packets are obtained. The time stamp is generated by a respective wireless node in the plurality of wireless nodes in response to receiving the positioning request from the portable electronic device. The time offset is associated with processing the positioning request by the wireless node. A normalized time stamp is generated for each time stamp in the set of time stamps based on the time offset information associated with each time stamp. A location of the portable electronic device is determined based on each of the normalized time stamps and known position of each wireless node in the plurality of wireless nodes.

In a further embodiment, an information processing system for determining a position of a portable electronic device is disclosed. The information processing system comprises memory and at least one processor communicatively coupled to the memory. The information processing system further comprises a device positioning manager communicatively coupled to the memory and the at least one processor. The device positioning manager is configured to perform a method. The method comprises obtaining a set of data packets from a plurality of wireless nodes, wherein each data packet in the set of data packets is associated with a positioning request from a portable electronic device. A time stamp and time offset information for each data packet in the set of data packets are obtained. The time stamp is generated by a respective wireless node in the plurality of wireless nodes on at least a microsecond scale in response to receiving the positioning request from the portable electronic device. The time offset is an offset between a system clock of the wireless node and a system clock of each remaining wireless node of the plurality of wireless nodes. A determination is made that each of the data packets in the set of data packets are associated with the same positioning request. In response to each of the data packets in the set of data packets being associated with the same positioning request, a determination is made that the positioning request is requesting a location in three-dimensional space. In response to determining that the positioning request is requesting a location in three-dimensional space, a determination is made whether data packets associated with the positioning request have been received from at least four wireless nodes. In response to data packets associated with the positioning request having failed to been received from at least four wireless nodes, an error message is sent to the portable electronic device. In response to data packets associated with the positioning request having been received from at least four wireless nodes a normalized time stamp is generated for each time stamp in the set of time stamps based on the time offset information associated with each time stamp. A location of the portable electronic device is then determined based on each of the normalized time stamps and known position of each wireless node in the plurality of wireless nodes.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Operating Environment

Figure 1:
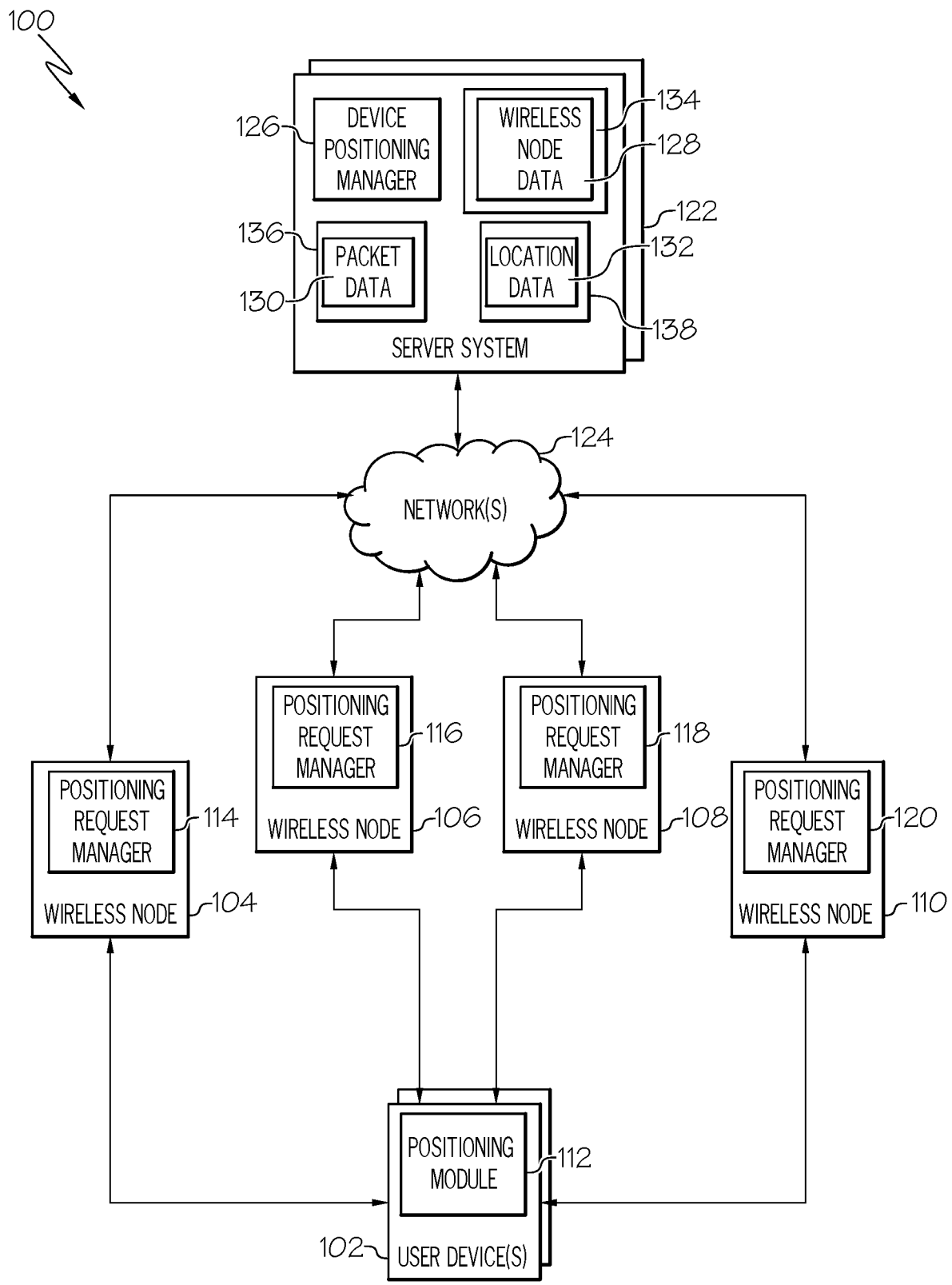
FIG. 1 is a block diagram illustrating one example of an operating environment according to one embodiment of the present disclosure.

FIG. 1 shows an operating environment 100 according to one embodiment of the present disclosure. The operating environment 100 comprises one or more user devices 102 communicatively coupled to a plurality of wireless nodes 104, 106, 108, 110. In one embodiment, a user device is an electronic device such as a wireless device capable of sending and receiving wireless signals. Examples of wireless devices include (but are not limited to) air-interface cards or chips, two-way radios, cellular telephones, mobile phones, smart phones, two-way pagers, wireless messaging devices, wearable computing devices, laptop computers, tablet computers, desktop computers, personal digital assistants, a combination of these devices, and/or other similar devices. A wireless node is any electronic device capable of at least receiving wireless signals and transmitting signals via wireless and/or wired transmission mechanisms. Examples of a wireless node include (but are not limited to) wireless routers, wireless access points, short-range communication transponders (e.g., radio frequency identification transponders, Bluetooth transponders, ZigBee transponders, etc.), cellular communication base stations, a combination of these devices, and/or other similar devices.

The user device 102 comprises a positioning module 112 configured to generate one or more data packets for wireless transmission to at least one of the wireless nodes 104, 106, 108, 110. The positioning module 112 is discussed in greater detail below. Each of the wireless nodes 104, 106, 108, 110 comprises a positioning request manager 114, 116, 118, 120 configured to manage positioning requests received from the user device 102. A positioning request can be an explicit or implicit request for location information. For example, the user device 102 can include data within a transmitted packet that explicitly informs the positioning request manager that the user device is requesting location data. Alternatively, the data packet does not comprise an explicit request for location information, but comprises information sufficient for the positioning request manager to deduce that the user device 102 is requesting location information. Also, the data packet can be any data packet being sent from the user device 102 to any destination within or outside of the same network or network combinations as the wireless nodes 104, 106, 108, 110, and server 122, or the data packet can be sent to a completely separate wireless network.

It should be noted that although FIG. 1 shows the positioning request manager 114, 116, 118, 120 residing within a wireless node 104, 106, 108, 110 this is not required. For example, in some embodiments, one or more of the positioning request managers 114, 116, 118, 120 reside within a computing device communicatively coupled to a wireless node 104, 106, 108, 110 via one or more communication/networking mechanisms. The positioning request managers 114, 116, 118, 120 are discussed in greater detail below.

In one embodiment, each of the wireless nodes 104, 106, 108, 110 is communicatively coupled to one another via wired and/or wireless communication mechanisms. The nodes 104, 106, 108 are also communicatively coupled to one or more server systems 122 through at least one network 124 via wired and/or wireless networking mechanisms. The network 124 can comprise wireless communication networks, non-cellular networks such as Wireless Fidelity (WiFi) networks, public networks such as the Internet, private networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks include one or more networks based on such standards. For example, in one embodiment, a wireless communication network comprises one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

The server system(s) 122 comprises a device positioning manager 126, wireless node data 128, packet data 130, and user device location data 132. The wireless node data 128, packet data 130, and device location data 132 are stored within a storage device and maintained by, for example, a database 134, 136, 138. Although shown stored separate from each other, the wireless node data 128, packet data 130, and device location data 132 can be co-located within the same storage device and database. In one embodiment, the device positioning manager 126 analyzes the wireless node data 128 and the packet data 130 to determine the location of a user device 102. This determined location is then stored at the server 122 (or remote from the server 122) as part of the user device location data 132. The location data 132, in one embodiment, is also transmitted to the user device 102 and/or a wireless node(s) 104, 106 108, 110.

In one embodiment, wireless node data 128 uniquely identifies each of the wireless nodes 104, 106 108, 110, their current location, with associated time stamp relative to the server, for which the location can be dynamic or fixed, and the time offsets of each wireless node with respect to the server system 122. Wireless node location information comprises data across multiple dimensions such as the x-dimension (longitude), y-dimension (latitude), and z-dimension (altitude). The wireless node data 128 can be provided to the server system 122 via a human and/or obtained from the wireless node itself. In the latter case, the wireless node comprises one or more sensors that detects its current position and transmits this data along with a unique identifier to the server system 122 at predefined intervals and/or upon request from the server system 122. Each wireless node 104 can also (optionally) act as a user device 102 with positioning module to use the system to determine its location.

The packet data 130, in one embodiment, comprises records received from each of the wireless nodes 104, 106, 108, 110 in response to receiving a positioning request from a user device 102. A record, in one embodiment, comprises the positioning request packet received by a wireless node 104 from a user device 102 or information associated therewith. A record can also include one or more of a unique identifier of the user device 102, a unique identifier of the wireless node 104, a unique identifier of the packet, and a timestamp generated by the wireless node 104. The timestamp identifies when the wireless node 104 received the positioning request packet from the user device 102. The device positioning manager 126, wireless node data 128, packet data 130, and user device location data 132 are discussed in greater detail below.

Determining the Location of a Wireless Device

As discussed above, a user device 102 is able to obtain its current location by communicating with one or more wireless nodes 104, 106, 108, 110, and retrieving its calculated position from the server system 122. In one embodiment, a user interacts with the positioning module 112 or an application in communication with the positioning module 112 and requests location data for the user device 102. For example, the user selects an option or a widget presented on a display of the device 102 that generates a command causing the positioning module 112 to wirelessly transmit a positioning request to the one or more wireless nodes 104, 106, 108, 110. In another embodiment, the positioning module 112 wirelessly transmits a positioning request without receiving input from the user. In this embodiment, the positioning module 112 automatically transmits a positioning request upon detection of a wireless node, at predefined intervals, and/or the like. In another embodiment, the user device 102 sends a data packet on another unknown wireless network, but is still received by wireless nodes 104, 106, 108, 110.

Upon determining that one or more positioning request criteria or triggering events (e.g., input from a user, detection of a wireless node, time interval has passed, etc.) have been satisfied or occurred, the positioning module 112 of the user device 102 wirelessly transmits a positioning request to the wireless nodes 104, 106, 108, 110. In one embodiment, prior to transmitting a signal representing a positioning request, the positioning module 112 first determines if a threshold number of wireless nodes 104, 106, 108, 110 has been detected. For example, if the location data for the user device is to comprise three dimensions such as latitude, longitude, and altitude at least four wireless nodes need to have been detected by the positioning module 112. In other words, if N dimensions are to be included within the location data at least N+1 wireless nodes need to have been detected by the positioning module 112. The positioning module 112, in one embodiment, detects a wireless node 104, 106, 108, 110 based on a wireless signal being broadcast by the wireless node. This signal comprises at least identification information uniquely identifying the wireless node. If the required number of wireless nodes 104, 106, 108, 110 has not been detected, the positioning module 112 presents a message via a user interface of the device 102 informing the user that the location of the device 102 cannot be determined.

In other embodiments, positioning operations can be performed to obtain the location of the user device 102 even if a lesser number of wireless nodes are detected than the required number of nodes. For example, if the system is default configured to provide positioning data with three dimensions (or if the user specifically requests positioning data with three dimensions) and only two wireless nodes 104, 106 have been detected, the positioning module 112 still transmits the positioning request to the wireless nodes 104, 106. In this embodiment, the positioning module 112 notifies the user that the location data will be provided with less dimensionality than originally requested. The positioning module 112 can further prompt the user for approval prior to sending the positioning request when the location data will include less dimensionality than originally requested or expected. In another embodiment, the positioning module 112 sends a positioning request regardless of whether any wireless nodes 104, 106, 108, 110 have been detected.

In some embodiments where the positioning module 112 first determines if wireless nodes 104, 106, 108, 110 have been detected prior to sending a positioning request, the positioning module 112 also determines if the signal strength between the wireless nodes and the user device 102 is above a given threshold. For example, the positioning module computes the Received Signal Strength Indicator (RSSI) of the signal received from a wireless node and determines if this value satisfies an RSSI threshold. This determination ensures that any data transmitted from the user device 102 will be properly received by a wireless node 104, 108, 106, 110. It should be noted that other mechanisms for determining signal strength are applicable as well. If the signal strength fails to satisfy the threshold, the positioning module 112 does not send the positioning request or waits until the signal strength satisfies the threshold. If the signal strength satisfies the threshold, the positioning module 112 sends the positioning request to the wireless nodes 104, 106, 108, 110.

Upon determining that a positioning request is to be sent to wireless nodes 104, 106, 108, 110, the positioning module 112 generates one or more data packets to be wirelessly transmitted to the nodes. The data packets can be generated according to various wireless communication standards. For example, the data packets can be generated according to cellular communication standards, Wireless Fidelity (WiFi) communication standards such as (but not limited to) 802.11, short-range communication standards such as Bluetooth and RFID communication standards, and/or the like. In one embodiment, the positioning module 112 is configured to generate a positioning request data packet(s) according to the communication standard of the network coupling the device 102 and wireless nodes 104, 106, 108, 110. For example, if the wireless nodes 104, 106, 108, 110 are wireless routers and a WiFi-based network couples the user device 102 to the nodes, then the positioning module 112 generates a positioning request data packet(s) according to a WiFi standard such as 802.11.

However, the user device 102 is not required to be registered with the wireless nodes 104, 106, 108, 110 or registered with the network comprising the nodes to transmit a positioning request data packet to the nodes. In this embodiment, the positioning module 112 generates a data packet according to a default communication standard or the standard corresponding to the communication mechanism (e.g., cellular, WiFi, Bluetooth, etc.) utilized to detect the wireless nodes 104, 106, 108, 110. In an embodiment where the positioning module 112 transmits positioning request data packets without detecting wireless nodes 104, 106, 108, 110, the packets are generated according to a default communication standard. Alternatively, the packets can be generated according to multiple standards and transmitted utilizing a plurality of communication mechanisms.

Figure 2:
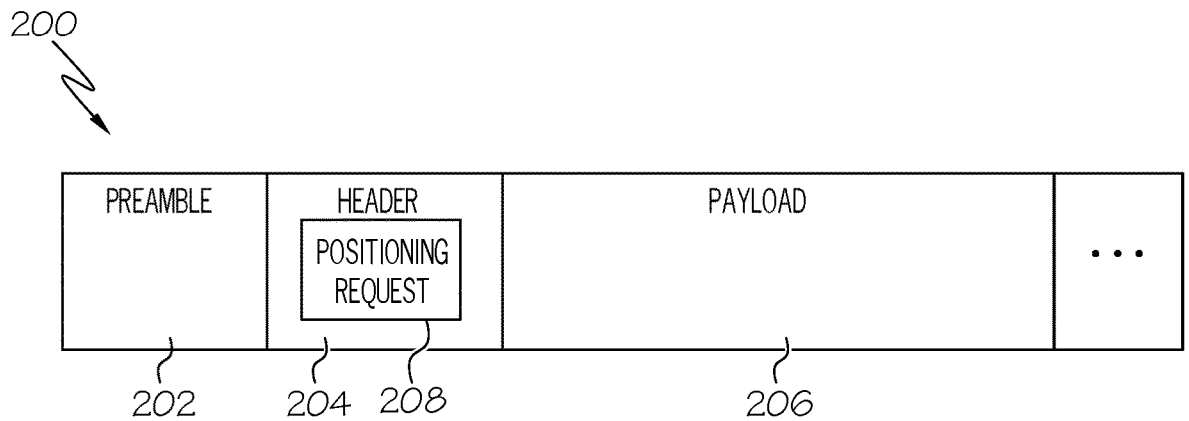
FIG. 2 shows one example of a wireless date packet according to one embodiment of the present disclosure.

FIG. 2 shows one example of a positioning request data packet 200 generated by the positioning module 112. In the example shown in FIG. 2, the data packet comprises at least a preamble 202, a header 204, and a payload 206. A positioning request indicator 208 is also shown within the header 204, but can reside within any of the other fields 202, 206 or additional fields not shown in FIG. 2. The positioning request indicator 208 can be a bit sequence, a specific value ("1" or "0") assigned to a specific bit or bits, text data within a field, and/or the like.

The user device 102 transmits a single positioning request data packet that is broadcast to all wireless nodes 104, 106, 108, 110 or transmits multiple packets that are each individually addressed to one of the wireless nodes. Each of the wireless nodes 104, 106, 108, 110 receives the positioning request data packet(s) transmitted by the user device 102. In some embodiments, the wireless nodes 104, 106, 108, 110 send an acknowledgment packet to the user device to indicate they have successfully received the transmitted packet. If the positioning module 112 does not detect an acknowledgement packet from a given wireless node within a predetermined amount from packet transmission, the positioning module 112 re-transmits the positioning request data packet(s) to the node (or all nodes) that has not acknowledged receipt of the previously transmitted data packet.

Upon reception of a positioning request data packet, the positioning request manager 114, 116, 118, 120 of each wireless node 104, 106, 108, 110 analyzes the packet and determines that packet is a positioning request packet based on the data within the packet. For example, a positioning request data packet can have a bit pattern or sequence within one or more fields that is detectable by a positioning request manager. This bit pattern/sequence indicates to the positioning request manager that the packet is a positioning request data. In another embodiment, an additional field can be added to the data packet comprising values/bits that are detectable by a positioning request data. In yet another embodiment, one or more reserved or unused bits can set to a value indicating that the data packet is a positioning request data packet.

Figure 3:
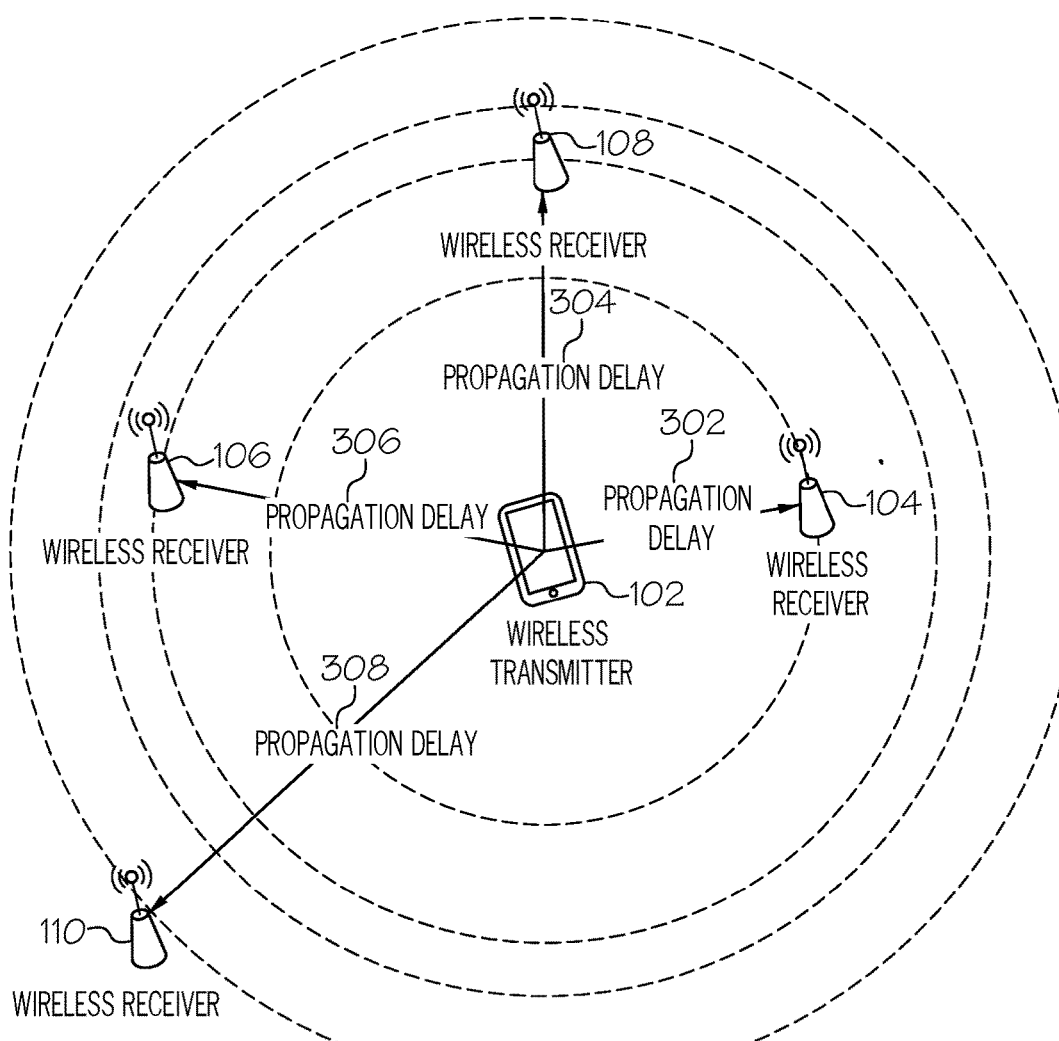
FIG. 3 shows propagation over time of a wireless signal as received by wireless receivers according to one embodiment of the present disclosure.

The positioning request managers 114, 116, 118, 120 also generate a time-stamp identifying the time at which the node received the positioning request data packet. In one embodiment, the system clock of the wireless nodes (or computing devices coupled to the nodes) comprises a resolution that enables a positioning request manager to generate a time stamp on a microsecond scale and, in some embodiments, on a nanosecond scale. In one embodiment, the wireless nodes 104, 106, 108, 110 are in time-sync with each other. Therefore, each of the positioning request managers 114, 116, 118, 120 generates a time stamp differing only by propagation delays 302, 304, 306, 308 as shown in FIG. 3. The wireless nodes 104, 106, 108, 110 can be time-synced to each other utilizing various synching mechanisms. For example, the wireless nodes 104, 106, 108, 110 sync their system clocks to a common clock such as the system clock of one of the nodes, the system clock of a given server, a Global Positioning System (GPS) signal, etc.

In one embodiment, the wireless nodes 104, 106, 108, 110 communicate with each other to initiate a time-sync operation. This communication identifies the common clock/signal that the nodes are to sync with taking into account any propagation and deterministic delays. In another embodiment, the system of a user device 102 is time-synced with a system clock of one of the wireless nodes 104, 106, 108, 110 or other system clock used to time-sync the wireless nodes with each other. In this embodiment, the user device 102 timestamps its positioning request data packet(s) sent to the nodes to identify when the device 102 transmitted the data packet(s). When syncing its clock, the user device 102 can take into account any propagation and deterministic delays.

In some instances, there may be variations in time-sync between the receiver of the wireless node 104, 106, 108, 110 and other components of the node such as the processor and positioning request manager 114, 116, 118, 120, or between the wireless node and a computing unit coupled to the node comprising the positioning request manager 114, 116, 118, 120. Therefore, each wireless node accounts for these variations in time-sync by determining and storing a time offset for use in location calculations. In one embodiment, the processing of network data at the wireless nodes 104, 106, 108, 110 is deterministic, as seen in RTOS, real-time operating systems. Therefore, the time offset accounts for deterministic hardware delays from the receiver of the wireless node and packet processing performed by the processor, positioning request manager, and/or the like. In embodiments, where the wireless node only receives/transits packets and a computing device coupled to the node processes received data packets and generates data packets for transmission, the time offset accounts for deterministic hardware delays from the network interface between the node and computing device and packet processing.

The process for computing the time offset utilizes half the round trip time. By using a fixed, known length cable, the positioning request managers 114, 116, 118, 120 calculate the theoretical travel time based on the speed of light, which is the speed or very close to at which electrons travel to find the time duration or deterministic processing. A data packet is sent via the wired connection from the wireless nodes to another, and the transmit and receive times are collected. A second packet is sent from the original receiver back to the original transmitter. Again, the transmit and receive times are collected. A determination can then be made as to which portion of the time is due to the length of the cable, and which portion is due to the propagation through the electronic components that make up the positioning request manager 114, 116, 118, 120.

The positioning request managers further calculate a time offset of their wireless node (or coupled computing device) from the server 122 and from each other either via wired network couplings, or by using trilateralization. In the latter, the configured locations of the wireless nodes 104, 106, 108, 10 are known, and instead of calculating for position, the positioning request managers 114, 116, 118, 120 can calculate for time. Also, if the wireless nodes 104, 106, 108, 110 (or optional coupled computing device) are time-synced with the server 122, an offset between the nodes and server is not required. Therefore, in one embodiment, a positioning manager calculates one or more of (collectively referred to herein as "time offset information") 1.) a deterministic delay at the node indicating the delay in time between receiving a positioning request data packet and processing the packet (e.g., identifying the packet as a positioning request data packet and generating the associated time stamp); 2.) a time-offset between its wireless node and the server 122 identifying the time difference between the system clocks of the wireless node and the server 122; and 3.) a time-offset between its wireless node and the other wireless nodes identifying the time difference between the system clocks of the wireless node and the other nodes. Alternatively, the device positioning manager 126 at the server system 122 performs the above time offset determination process instead of the positioning request managers 114, 116, 118, 120.

In one embodiment, the offset is calculated between a receiver node 104 and the server 122, and then the receiver nodes 104 and the remaining receiver nodes. Any combination of these offsets can be used to calculate the offset between the server 122. The server 122, in one embodiment, acts as the master time source. In this embodiment, the server 122 utilizes the offsets of each receiver node as relative to itself. The time offset is used combined with the timestamp of the receiver nodes to transpose the timestamp relative to the server 122. This eliminates a need to update the system clocks on each receiver and allows for drift as the time offsets are calculated at a configurable interval.

Each positioning request manager 114, 116, 118, 120 forwards the positioning request data packet received from a user device 102 to the server 122. In one embodiment, the packet is forwarded to the server 122 along with its generated time stamp, time offset information calculated by the request manager, and an optional unique identifier of the wireless node (or optional computing device coupled to the node). A unique identifier associated with a wireless node 104, 106, 108, 110 (and the user device 102) can be of any type. Examples of unique identifiers include a universally unique identifier (UUID), globally unique identifier (GUID), device ID, MAC address, IP address, and/or the like. The unique identifier, in one example, is a bit sequence ranging in length from 16 bits to 128 bits. The length of the bit sequence can be lengthened or shortened depending on the number of devices in which to locate.

It should be noted that the time stamp and/or time offset information can be sent separate from the positioning request data packet or as part of the data packet. For example, the positioning request manager 114, 116, 118, 120 can embed the time stamp and/or time offset information within one or more fields (e.g., preamble, header, payload, etc.) of the forwarded data packet and/or add one or more additional fields to the packet. In another embodiment, the positioning request manager 114, 116, 118, 120 generates its own data packet(s) to be sent to the server 122. For example, the positioning request manager analyzes the received positioning request data packet and extracts various information from the packet such as a unique identifier of the user device 102 and source/sender address (if the identifier and source/sender address are not the same). There can be an association made from the sender address to another unique identifier if anonymity is desired, therefore only the device and server know its relationship. The positioning request manager 114, 116, 118, 120 generates a new data packet according to one or more communication standards comprising the data extracted from the positioning request data packet along with the time stamp and time offset information generated by the positioning request manager. This new data packet will also comprise a unique identifier associated with the wireless node (or optional computing device) as well.

The server 122 receives the data packet(s) from the wireless nodes 104, 106, 108, 110 and stores the entire packet (or a portion of the packet) as packet data 130. If the time stamp and time offset data are received separate from the packet, this data is stored as part of the wireless node data 128. If the time stamp and time offset data are received as part of the data packet, the device positioning manager 126 of the server 122 can extract this data from the packet and store it separately as wireless node data 128, or forego the extraction process so that time stamp and time offset data is kept within the packet and stored as packet data 130. In some embodiments, the server 122 includes or excludes only specified transmitters, and/or includes or excludes data from only specified wireless receivers.

When the server 122 receives a data packet from a wireless node 104, 106, 108, 110, the device positioning manager 126 analyzes the packet to determine if the packet is associated with a positioning request from a user device 102. If the wireless node forwarded the positioning request data packet from the user device 102 to the server 122, the device positioning manager 126 identifies a received packet as a positioning request data packet similar to that discussed above with respect to the positioning request managers of the wireless nodes. If the wireless node 104, 106, 108, 110 generates a new data packet, this new data packet comprises data that identifies the packet as being associated with a positioning request similar to that discussed above with respect to the positioning request data packet sent from the user device 102 to the wireless nodes 104, 106, 108, 110.

Once the device positioning manager 126 identifies a received data packet as being associated with a positioning request from a user device 102, the device positioning manager 126 analyzes other packets received from other wireless nodes to determine if a threshold number of wireless nodes 104, 106, 108, 110 have sent a data packet(s) associated with the same positioning request. Stated differently, the device positioning manager 126 determines if a threshold number of wireless nodes received the same data positioning data packet(s) from a user device 102. In one embodiment, the threshold number is 4, but other thresholds are applicable as well.

The device positioning manager 126 makes the above determination by comparing the characteristics of data packets received from the wireless nodes 104, 106, 108, 110. For example, each time the user device 102 sends out a positioning request data packet it can add a unique request ID to the packet. This unique request ID is incremented each time a different request is sent by the device 102. The request ID is transmitted as part of (or along with) the data packet sent from the wireless nodes 104, 106, 108, 110 to the server 122. The device positioning manager 126 analyzes received packets to determine if data packets comprising or associated with the same request ID have been received from a threshold number of wireless nodes. In another embodiment, the device positioning manager 126 can generate a fingerprint such as a hash value associated with each of the packets or a given portion of each of the packets. Packets associated with the same fingerprint can be considered to be associated with the same positioning request. In additional embodiments, other attributes of data packets or data associated therewith are match and compared to identify packets associated with the same positioning request.

If a threshold number of wireless devices have not been detected, the device positioning manager 126 continues analyzing received packets for a given period of time. If packets associated with the same positioning request have not been detected within the given time period, the server 122 wirelessly transmits an error message to the user device 102. For example, the device positioning manager 126 extracts the address of the user device 102 from the received packet from, for example, the source/sender field or any other field of the packet. The device positioning manager 126 utilizes this address to send the error message to the user device 102.

If a threshold number of wireless devices have been detected, the device positioning manager 126 analyzes the wireless node data 128 and/or the packet data to calculate a location of the user device 102. In one embodiment, the device positioning manager 126 utilizes the time offsets associated with each of the received packets for a given positioning request to normalize the time stamps associated therewith. Using the time stamps, the device positioning manager 126 calculates the time difference of arrival (TDOA) for the wireless nodes 104, 106, 108, 110. If location is to be determined in a three-dimensional space, one embodiment utilizes at least four wireless nodes 104, 106, 108, 110 to send a data packet(s) to the server 122. In this embodiment, three TDOA measurements are calculated. The TDOA measurements and the known locations of the wireless nodes (represented in a three-dimensional space of x, y, and z coordinates) are utilized to calculate a position on three hyperboloids (one hyperboloid for each TDOA measurement). The intersection of two of the hyperboloids describes a curve on which the user device 102 lies. The intersection of the third hyperboloid with the curve found from the first two hyperboloids defines a unique point in space comprising x, y, and z coordinates of the user device 102. These coordinates are then stored as device location 132 at the server 122.

In another embodiment, the device positioning manager 126 utilizes a time of arrival (TOA) calculation to determine the position of the user device 102. TOA uses the absolute time of arrival of the positioning request data packet at the wireless nodes 104, 106, 108, 108 as compared to the measured time difference of packet reception between the nodes. Similar to the TDOA embodiment discussed above, utilizes the time offsets associated with each of the received packets for a given positioning request to normalize the time stamps associated therewith. Using the time stamps identifying arrival of the positioning request data packet at each wireless node 104, 106, 108, 110 and the time stamp indicating when the user device 102 transmitted the positioning request data packet, the device positioning manager 126 performs a TOA operation to calculate the distance of the user device 102 from each of the wireless nodes. Then using the known x, y, and z coordinates of the wireless nodes and the calculated distance of the user device 102 from each node, a trilateration calculation is performed to calculate the position (x, y, and z coordinates) of the user device 102. These coordinates are then stored as device location 132 at the server 122. In one embodiment, the server 122 comprises a security/privacy layer that only allows authorized users to retrieve the transmitting device's location. It should be noted that embodiments of the present disclosure are not limited to TOA and TDOA mechanisms to determine the position of the user device 102, and other mechanisms are applicable as well.

In the event that the threshold number of wireless nodes 104, 106, 108, 110 is not met for 3-dimensional space calculations, a fallback to 2-dimensional space can be configured at the sever 122 based on the altitude coordinate of various wireless nodes. An assumption will be made that the user device 102 is at a similar altitude of the wireless nodes 104, 106, 108, 110 or that this altitude is estimated via one or more algorithms.

Once the device positioning manager 126 has determined the location of the user device 102, the device positioning manager 126 generates one or more data packets comprising the location data associated with the user device and transmits the data packet(s) to the user device 102. For example, the device positioning manager 126 extracts the address of the user device 102 from the device positioning packet or associated packet generated by a wireless node 104, 106, 108, 110. This address can reside in any field of the packet such as the source/sender field. The device positioning manager 126 utilizes this address to send the data packet(s) comprising the location data to the user device 102. The user device 102 receives the data packet(s) from the server 122 and identifies this packet as a response to its positioning request based on the data within one or more fields of the packet. The user device 102 extracts the location data from the data packet and presents the location data to the user. For example, the coordinates of the user device can be presented on the display of the device, an icon or widget can be displayed on a map, and/or the like. A map can be a two-dimensional or three-dimensional map. If the map is a three-dimensional map, not only is the x and y position of the user device displayed but so is the z position (i.e., altitude). For example, the map can be a graphical representation of a building comprising multiple floors. An icon can be displayed on a given floor/level (e.g., z position) at a given x/y position of the floor/level.

It should be noted that the embodiment discussed above are also applicable to wireless receiver nodes that move dynamically. In this embodiment, the mobile wireless receiver nodes acts as the wireless device requesting its location from the server 122 and transmits its positioning request to other wireless receiver nodes. The number of mobile wireless receivers should not reduce the number of fixed wireless receivers below one more than the number of desired dimensions for the location desired.

Figure 4:
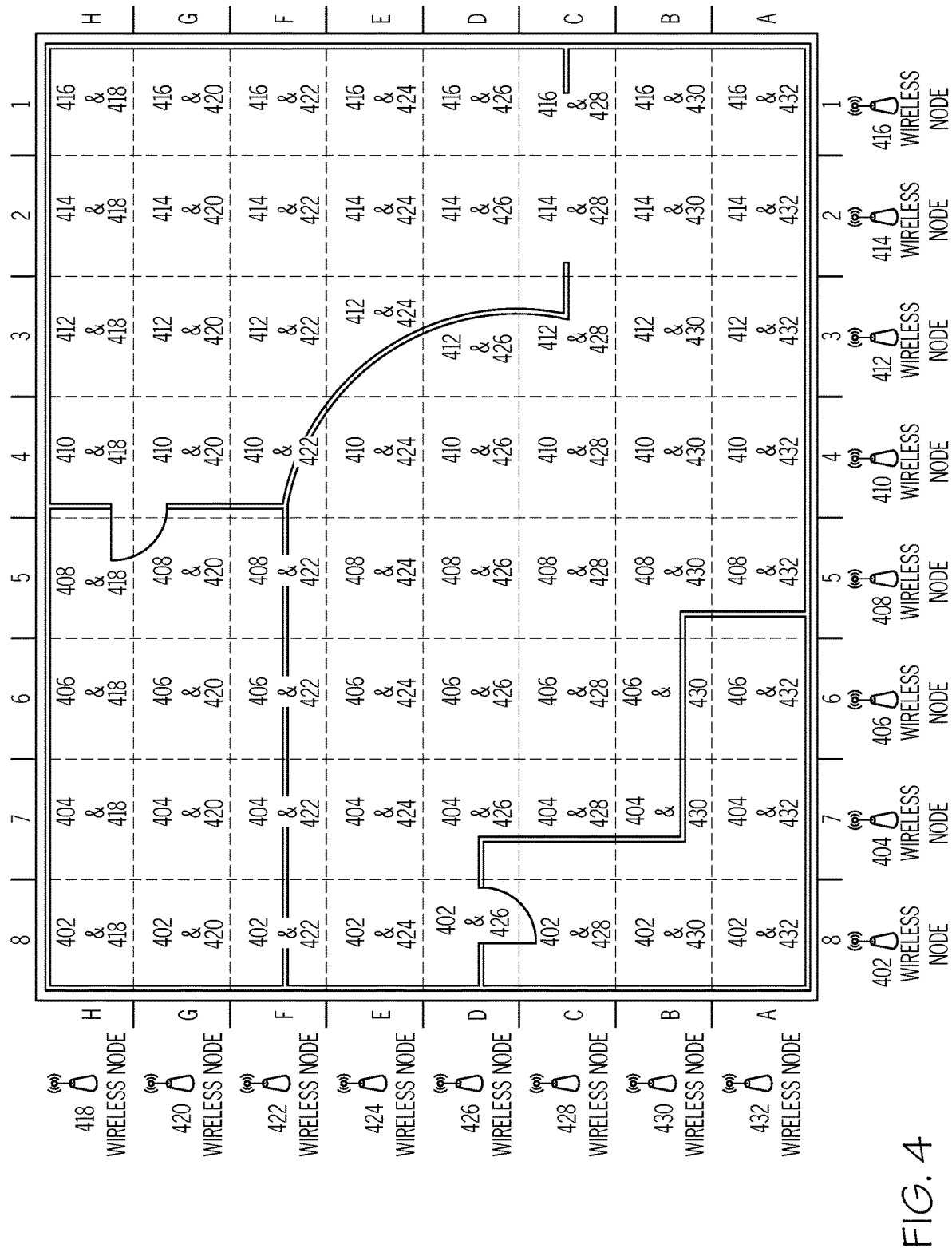
FIGS. 4 and 5 show a one example of a grid for use with directionally shaped transmitting wireless nodes for determining the location of a wireless device according to one embodiment of the present disclosure.

FIG. 4 shows another embodiment that utilizes Wi-Fi fingerprinting for determining the location of a transmitter. In this embodiment, the system comprises wireless nodes 402-432 arranged in fixed positions along a perimeter of an area where user device 434 may be located. The wireless nodes utilize, as an example, a Yagi antenna, panel antenna, sector antenna or directional antenna, or similar to control the wireless pattern emitted from the wireless nodes 402-432. When a Yagi directional antenna is used, the transmission of the wireless nodes can be focused in a straight beam of a fixed and configurable width depending on the exact design of the Yagi antenna. The design of the installation and positioning of the wireless nodes 402-432 is to form a grid pattern.

The numbering in FIG. 4 illustrates only those wireless nodes that are detectable in each grid section due to directional antennas and signal shaping. Detection of a wireless node refers to a wireless signal that meets one or more configurable criteria such as but not limited to signal strength. For each section of the grid, the user device is detected by 1 to N wireless nodes 402-432. As an example, user device is detected by wireless node 408 and wireless node 426 at position D5, and thus makes a request to the server 122 to determine its position as this is a unique signature for the grid. No adjacent grid sections have the same signature, or set of detectable transmissions from wireless nodes 402-432. The server 122 is able to determine the position of the user device by its unique signature for the grid. The user device can make periodic requests to the server 122 to retrieve its calculated position from the database of server 122.

The user device, via a hardware or software program, detects the wireless nodes and a unique identifier in the transmission from the wireless nodes 402-432. The user device looks up these IDs in a database that can be located either on the user device itself, or retrieved from the server 122. In one embodiment, the wireless nodes 402-432 can be 802.11 wireless routers that are configured to broadcast an SSID containing each node's unique ID. Encryption can be optionally added to this system to prevent unauthorized wireless nodes from spoofing or impersonating the system. This can be implemented in one example by encrypting the SSID, and then decrypted by the user device using the system's public key.

Figure 5:
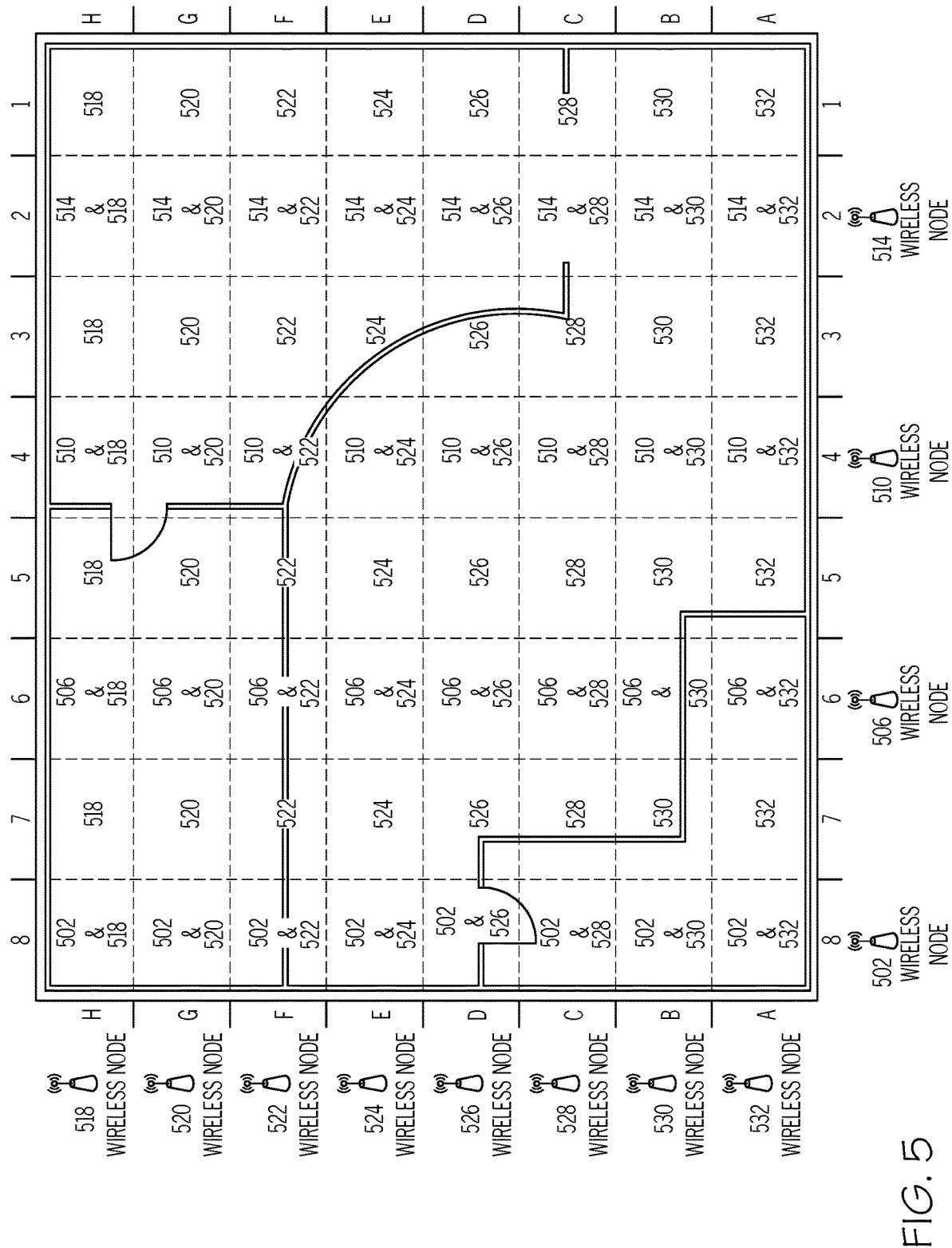

The cost of implementing this system can be kept low by increasing the size of grid sections (lower accuracy) or by also creating a sparse grid (similar accuracy). In this example, wireless nodes 404, 408, 412, and 416 are removed, resulting in FIG. 5. The user device maintains record of which grid it was last in. In this example, when user device changes from position D4 to D3, it now only detects wireless node 526. When requesting this ID from the server 122, there are multiple possible responses, however when considering the last position of D4 where wireless nodes 510 and 526 are detected, there are only two possible adjacent grid sections. Using dead reckoning via device sensors, including a compass, the correct grid section can be selected with high probability. This example can be taken to a further degree by removing additional wireless nodes in the same manner as to create "dead" grid sections adjacent to known grid sections. The system's accuracy for determining which sparse grid is most probable can be enhanced by configuring the server with map data. For example, curved wall at positions F4, E4, E3, D3, and C3 lowers the probability of a user device moving from position E4 to positon E3, and then onto position F3. Therefore, the most probable is the user device had moved to position F5.

In another embodiment, wireless nodes 104, 106, 108, 110 are Bluetooth low energy devices. In this example, the user device 102 detects the beacon broadcast from the wireless nodes. For increased compatibility, the wireless nodes can implement the Apply iBeacon protocol either solely, or in addition to a more generic protocol. The wireless nodes 104, 106, 108, 110 communicate with adjacent nodes to perform time synchronization. Wireless nodes 104, 106, 108, 110 have an additional parameter of priority. This priority setting is arbitrary, but is needed to determine when devices are communicating, which is authoritative for time syncing. In this manner, no time offsets are needed at the server 122, but N+2 wireless devices are needed for the user device 102 to accurately calculate its position. The data packets broadcast from the wireless nodes 104, 106, 108, 110 comprise a time stamp and their unique ID. Additional data may be present such as the priority parameter, or other parameters as needed to increase accuracy.

In another embodiment, the wireless nodes 104, 106, 108, 110 transmit a data packet encoded in a sound wave. Using AM and FM to encode a data packet that includes the unique ID of the transmitting wireless node, the user device 102 demodulates the sound wave that it receives via its microphone 534. The sound wave can be and may be preferred to be implemented at high frequency as to not disturb human hearing, and have less interference from background noise such as humans talking. The transmission of the data via the sound wave is performed in a constant and repeating manner such that the user device 102 can determine a time offset. Transmission of the sound wave from the wireless nodes 104, 106, 108, 110 is such that the beginning of the pattern is sent at a well know/established time. This time can be configured at the server 122 and retrieved by both the wireless nodes 104, 106, 108, 110 and the user device 102.

As an example, the pattern could be set to start exactly at the beginning of each second, or as the size of the data packet increases, each 10 seconds, 20 seconds, etc. Since the wireless nodes 104, 106, 108, 110 and user device are in time sync, or can determine each other's time accurately via the time offset stored at the server 122, the time of flight can be calculated based on the offset of the received sound wave. Since sound travels through air at a known rate, the user device can calculate its distance from the wireless node. Using these distance measurements from a plurality of wireless nodes 104, 106, 108, 110, trilateralization can be used to determine user device 102 position.

Figure 6A:
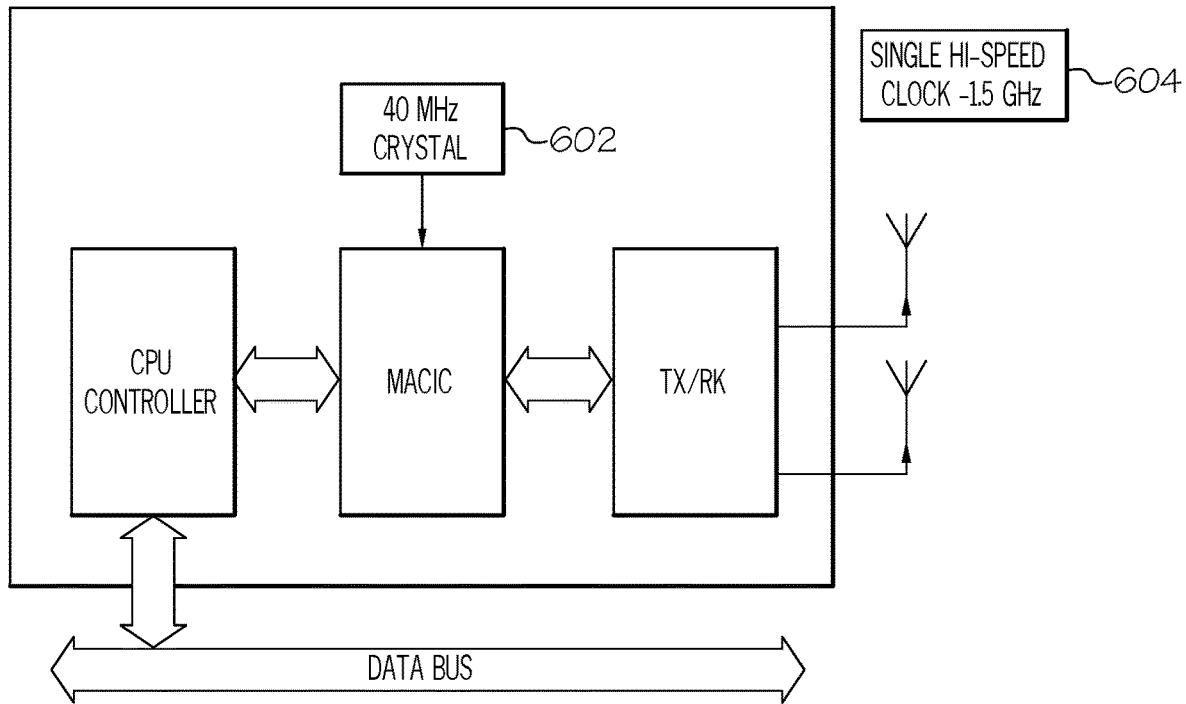
FIG. 6A is a block diagram illustrating one example of a wireless receiver with high resolution clock according to one embodiment of the present disclosure.
Figure 6B:
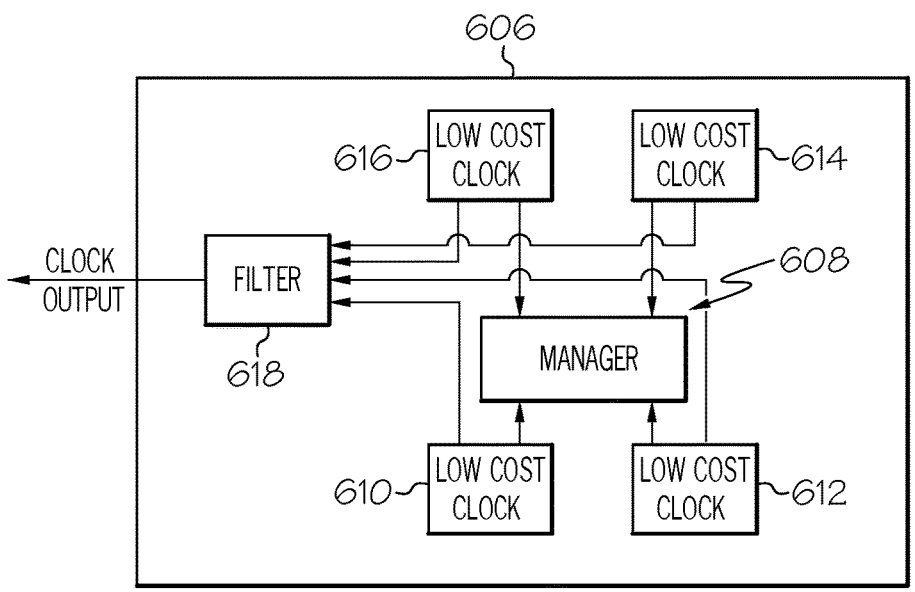
FIG. 6B is a block diagram illustrating one example of an array of low cost clocks outputting a high resolution clock according to one embodiment of the present disclosure.

In order to achieve higher accuracy positioning results, one or more embodiments utilize a hi-res clock 604 in-place of typically found 40 Mhz crystal clock 602 in radio chips where, as shown in FIG. 6. In another embodiment, an array of low cost clocks 610, 612, 614, 616 are managed by a timing manager 608 to operate at equal timing offsets such that it creates a higher resolution time output. The manager 608 sets each low cost clock 610, 612, 614, 616 to run by slightly delaying its triggering edges. A filter 618 is used to smooth the output from the plurality of low cost clocks 610, 612, 614, 616.

Operational Flow Diagrams

Figure 7:
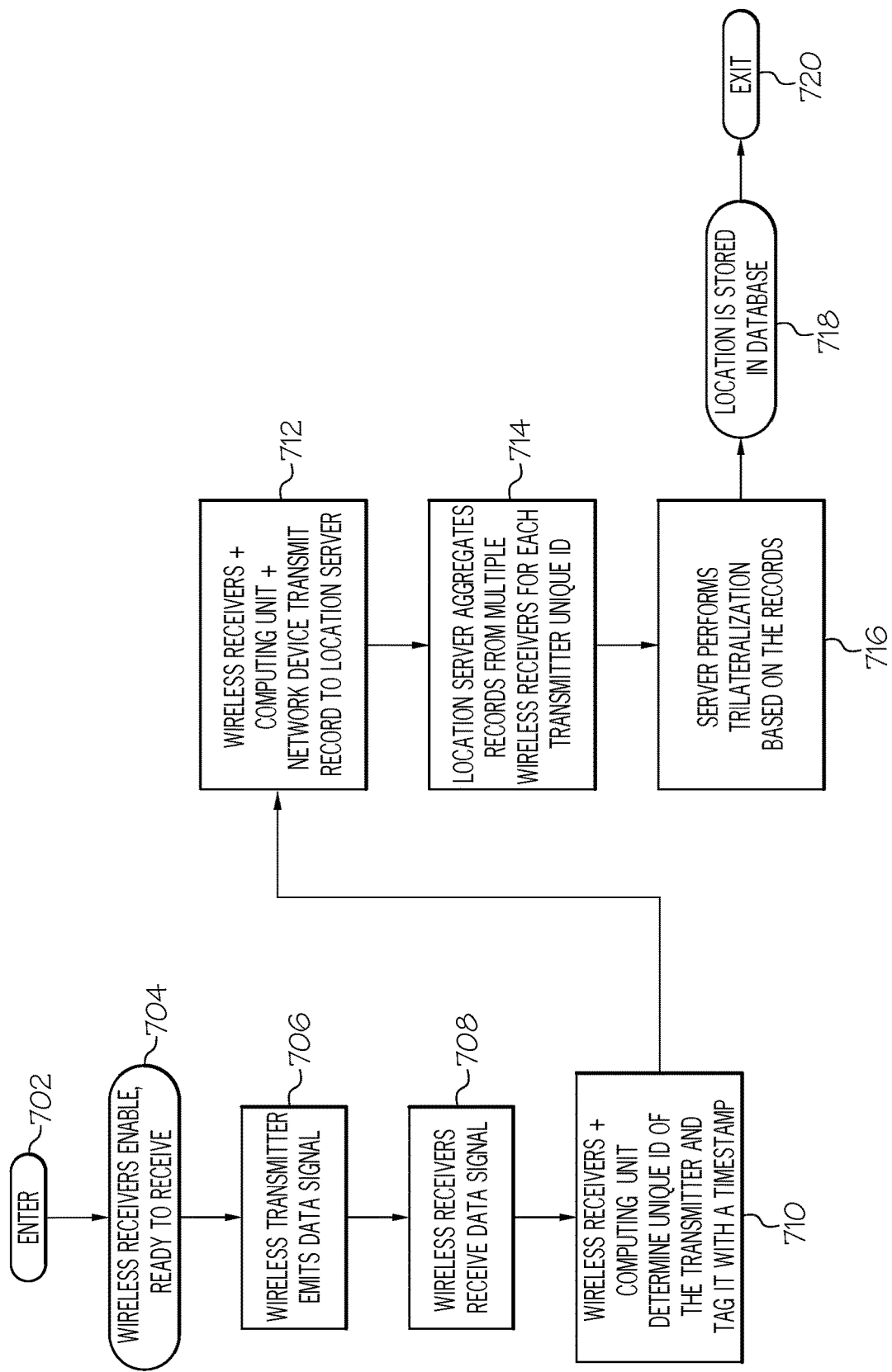
FIG. 7 is an operational flow diagram illustrating one example of determining a location of a wireless device according to one embodiment of the present disclosure.

FIG. 7 is an operational flow diagram illustrating one example of determining the location of a user device. The operational flow diagram of FIG. 7 begins at step 702 and flows directly to step 704. The wireless nodes 104, 106, 108, 110, at step 704, are enabled and ready to receive. The user device 102, at step 706, transmits a data signal. The wireless nodes 104, 106, 108, 110, at step 708, receive the data signal. The wireless nodes 104, 106, 108, 110, at step 710, or a computing device communicatively coupled to the nodes determine the unique ID of the user device and tag the received data packet(s) with a time stamp. The wireless nodes 104, 106, 108, 110, at step 712, transmit a record to a location server 122. The location server 122, at step 714, aggregates records from multiple wireless nodes 104, 106, 108, 110 for each user device unique ID. The server 122 performs an additional step 730 that filters improbable data. The filter utilizes one or more algorithms for detecting reflected waves, multi-path data, and non-line of site data as examples. The server 122, at step 716, performs trilateralization based on the records to determine a location of the user device 102. As part of step 716, error correction algorithms are optionally executed such as detecting and discarding data from multi-path arrivals, or non-line of sight reflected signal data. In one example, the use of angle of arrival (AoA) can be used to determine if a signal is a reflected signal by comparing it with others. This is a non-time dependent measurement and, therefore, does not rely on time synchronization. The server 122, at step 718, stores the location data 132 within a database. The control flow ends at step 720.

Figure 8:
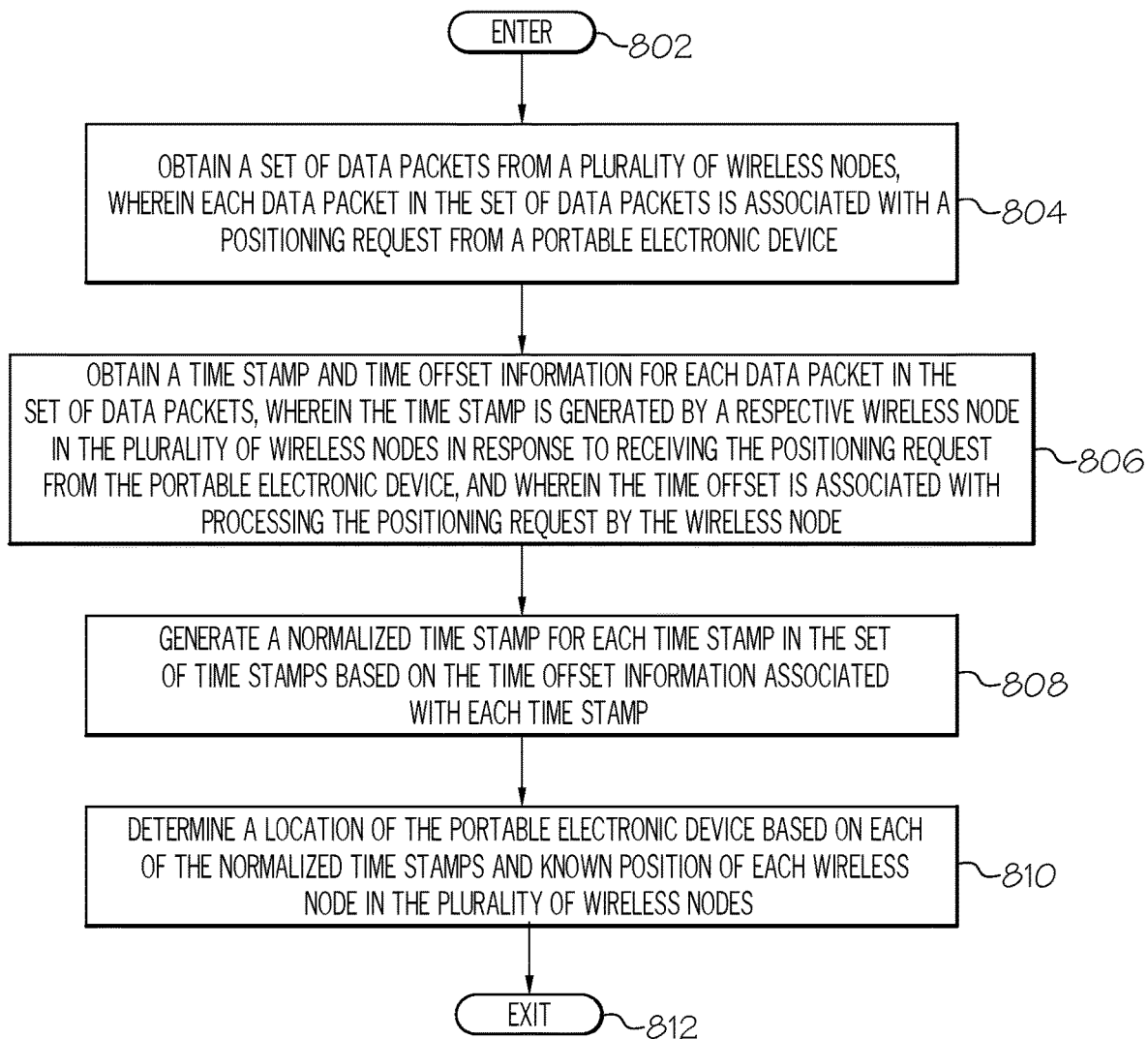
FIG. 8 is an operational flow diagram illustrating another example of determining a location of a wireless device according to one embodiment of the present disclosure.

FIG. 8 is an operational flow diagram illustrating another example of determining the location of a user device. The operational flow diagram of FIG. 8 begins at step 802 and flows directly to step 804. The device positioning manager 126, at step 804, obtains a set of data packets from a plurality of wireless nodes 104, 106, 108, 110. Each data packet in the set of data packets is associated with a positioning request from a portable electronic device 102. The device positioning manager 126, at step 806, obtains a time stamp and time offset information for each data packet in the set of data packets. The time stamp is generated by a respective wireless node in the plurality of wireless nodes 104, 106, 108, 110 in response to receiving the positioning request from the portable electronic device 102. The time offset is associated with processing the positioning request by the wireless node. The device positioning manager 126, at step 808, generates a normalized time stamp for each time stamp in the set of time stamps based on the time offset information associated with each time stamp. The device positioning manager 126, at step 810, determines a location of the portable electronic 102 device based on each of the normalized time stamps and known position of each wireless node in the plurality of wireless nodes 104, 106, 108, 110. The control flow exits at step 812.

Electronic Device

Figure 9:
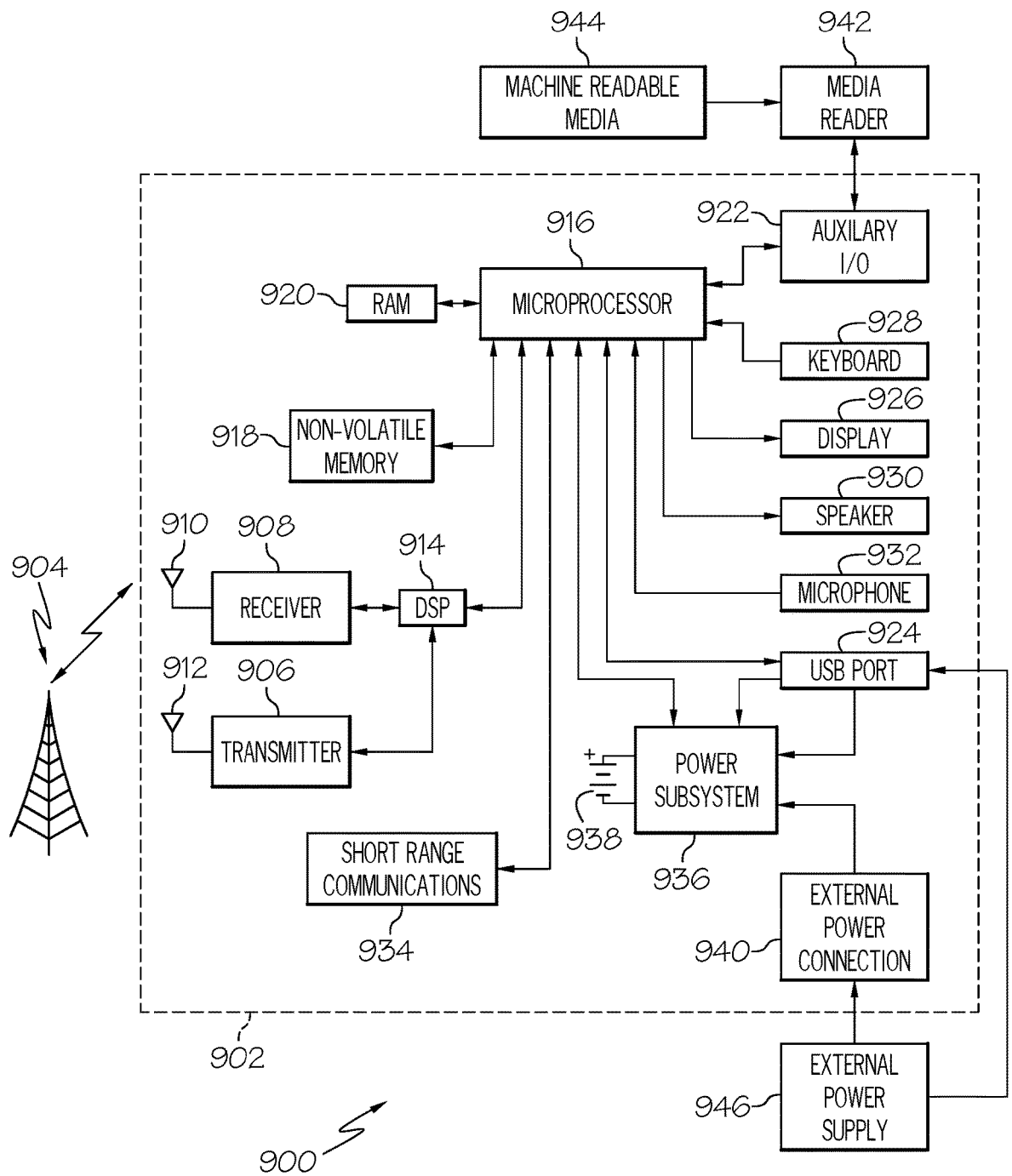
FIG. 9 is a block diagram illustrating one example of a wireless communication device according to one embodiment of the present disclosure.

FIG. 9 is a block diagram of an electronic device and associated components 900 in which the systems and methods disclosed herein may be implemented. In this example, an electronic device 902 is the user device 102 of FIG. 1 and is a wireless two-way communication device with voice and data communication capabilities. Such electronic devices communicate with a wireless voice or data network 904 using a suitable wireless communications protocol. Wireless voice communications are performed using either an analog or digital wireless communication channel. Data communications allow the portable electronic device 902 to communicate with other computer systems via the Internet. Examples of electronic devices that are able to incorporate the above described systems and methods include, for example, a data messaging device, a two-way pager, a cellular telephone with data messaging capabilities, a wireless Internet appliance, a tablet computing device or a data communication device that may or may not include telephony capabilities.

The illustrated portable electronic device 902 is an example electronic device that includes two-way wireless communications functions. Such electronic devices incorporate communication subsystem elements such as a wireless transmitter 906, a wireless receiver 908, and associated components such as one or more antenna elements 910 and 912. A digital signal processor (DSP) 914 performs processing to extract data from received wireless signals and to generate signals to be transmitted. The particular design of the communication subsystem is dependent upon the communication network and associated wireless communications protocols with which the device is intended to operate.

The portable electronic device 902 includes a microprocessor 916 that controls the overall operation of the portable electronic device 902. The microprocessor 916 interacts with the above described communications subsystem elements and also interacts with other device subsystems such as non-volatile memory 918 and random access memory (RAM) 920. The non-volatile memory 918 and RAM 920 in one example contain program memory and data memory, respectively. The microprocessor 916 also interacts with an auxiliary input/output (I/O) device 922, a Universal Serial Bus (USB) and/or other data port(s) 924, a display 926, a keyboard 928, a speaker 930, a microphone 932, a short-range communications subsystem 934, a power subsystem 936 and any other device subsystems.

A power supply 938, such as a battery, is connected to a power subsystem 936 to provide power to the circuits of the portable electronic device 902. The power subsystem 936 includes power distribution circuitry for providing power to the portable electronic device 902 and also contains battery charging circuitry to manage recharging the battery power supply 938. The power subsystem 936 includes a battery monitoring circuit that is operable to provide a status of one or more battery status indicators, such as remaining capacity, temperature, voltage, electrical current consumption, and the like, to various components of the portable electronic device 902. An external power supply 946 is able to be connected to an external power connection 940.

The data port 924 further provides data communication between the portable electronic device 902 and one or more external devices. Data communication through data port 924 enables a user to set preferences through the external device or through a software application and extends the capabilities of the device by enabling information or software exchange through direct connections between the portable electronic device 902 and external data source rather than via a wireless data communication network.

Operating system software used by the microprocessor 916 is stored in non-volatile memory 918. Further examples are able to use a battery backed-up RAM or other non-volatile storage data elements to store operating systems, other executable programs, or both. The operating system software, device application software, or parts thereof, are able to be temporarily loaded into volatile data storage such as RAM 920. Data received via wireless communication signals or through wired communications are also able to be stored to RAM 920. As an example, a computer executable program configured to perform one or more processes described above is included in a software module stored in non-volatile memory 918.

The microprocessor 916, in addition to its operating system functions, is able to execute software applications on the portable electronic device 902. A predetermined set of applications that control basic device operations, including at least data and voice communication applications, can be installed on the portable electronic device 902 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the portable electronic device 902 through, for example, the wireless network 904, an auxiliary I/O device 922, USB port 924, short-range communications subsystem 934, or any combination of these interfaces. Such applications are then able to be installed by a user in the RAM 920 or a non-volatile store for execution by the microprocessor 916.

In a data communication mode, a received signal such as a text message or a web page download is processed by the communication subsystem, including wireless receiver 908 and wireless transmitter 906, and communicated data is provided the microprocessor 916, which is able to further process the received data for output to the display 926, or alternatively, to an auxiliary I/O device 922 or the data port 924. A user of the portable electronic device 902 may also compose data items, such as e-mail messages, using the keyboard 928, which is able to include a complete alphanumeric keyboard or a telephone-type keypad, in conjunction with the display 926 and possibly an auxiliary I/O device 922. Such composed items are then able to be transmitted over a communication network through the communication subsystem.

For voice communications, overall operation of the portable electronic device 902 is substantially similar, except that received signals are generally provided to a speaker 930 and signals for transmission are generally produced by a microphone 932. Alternative voice or audio I/O subsystems, such as a voice message recording subsystem, may also be implemented on the portable electronic device 902.

Although voice or audio signal output is generally accomplished primarily through the speaker 930, the display 926 may also be used to provide an indication of the identity of a calling party, the duration of a voice call, or other voice call related information, for example.

A short-range communications subsystem 936 provides for communication between the portable electronic device 902 and different systems or devices, which need not necessarily be similar devices. For example, the short-range communications subsystem 936 may include an infrared device and associated circuits and components or a Radio Frequency based communication module such as one supporting Bluetooth® communications, to provide for communication with similarly-enabled systems and devices.

A media reader 942 is able to be connected to an auxiliary I/O device 922 to allow, for example, loading computer readable program code of a computer program product into the portable electronic device 902 for storage into non-volatile memory 918. In one example, computer readable program code includes instructions for performing one or more processes described above. One example of a media reader 942 is an optical drive such as a CD/DVD drive, which may be used to store data to and read data from a computer readable medium or storage product such as computer readable storage media 944. Examples of suitable computer readable storage media include optical storage media such as a CD or DVD, magnetic media, or any other suitable data storage device. Media reader 942 is alternatively able to be connected to the electronic device through the data port 924 or computer readable program code is alternatively able to be provided to the portable electronic device 902 through the wireless network 904.

Information Processing System

Figure 10:
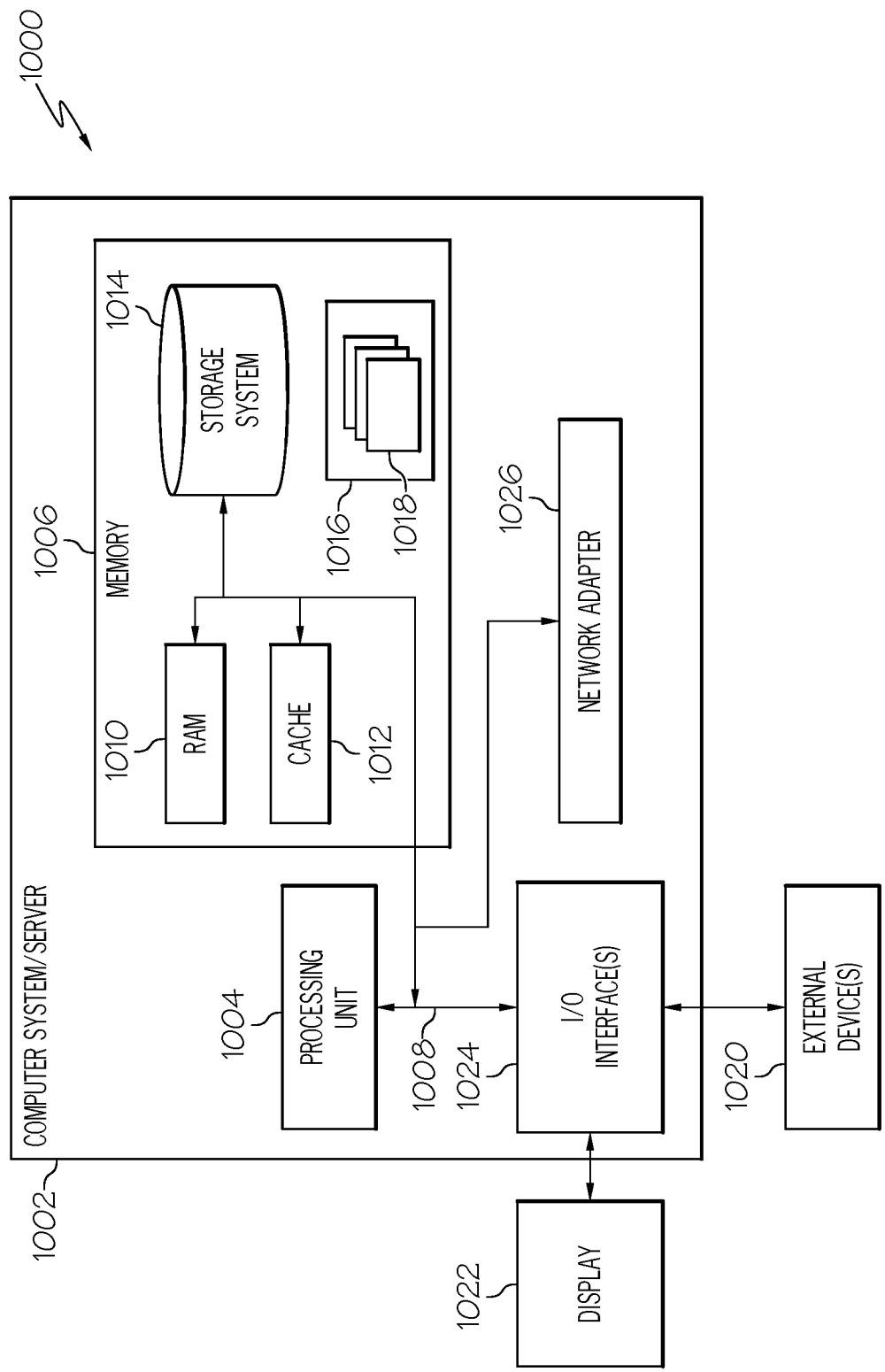
FIG. 10 is a block diagram illustrating one example of an information processing system according to one embodiment of the present disclosure.

Referring now to FIG. 10, this figure is a block diagram illustrating an information processing system that can be utilized in embodiments of the present disclosure. The information processing system 1002 is based upon a suitably configured processing system configured to implement one or more embodiments of the present disclosure such as the server system 122 of FIG. 1. It should be noted that various components of FIG. 9 and/or FIG. 10 and their respective descriptions are also applicable to the wireless nodes 104, 106, 108, 110 of FIG. 1.

Any suitably configured processing system can be used as the information processing system 1002 in embodiments of the present disclosure. The components of the information processing system 1002 can include, but are not limited to, one or more processors or processing units 1004, a system memory 1006, and a bus 1008 that couples various system components including the system memory 1006 to the processor 1004. The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 10, the main memory 1006 includes the device positioning manager 126 (or the positioning request managers 114, 116, 118, 112, 120). The device positioning manager 126 can reside within the processor 1004, or be a separate hardware component. The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present disclosure.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the present disclosure.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices. Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, at an information processing system, for determining a position of a portable electronic device, the method comprising:

receiving, by the information processing system, a positioning request from a portable electronic device, wherein the positioning request is associated with a defined area comprising a plurality of wireless nodes, each wireless node in the plurality of wireless nodes being situated at a given location within the defined area, wherein the plurality of wireless nodes is arranged in an x-y configuration forming a sparse grid, the sparse grid comprising a plurality of sections where each section is defined by a transmission signature corresponding to a wireless node grouping from the plurality of wireless nodes, and where the positioning request comprises the transmission signature detected by the portable electronic device for at least one section of the plurality of sections;

responsive to a determination that the transmission signature within the positioning request is detectable within multiple sections of the plurality of sections, determining, by the information processing system, that a first section of the multiple sections adjacent to a last known position of the portable electronic device comprises an interior structure and a second section of the multiple sections adjacent to the last known position is without an interior structure; and selecting, by the information processing system, the first section as a current position of the portable electronic device in response to determining that the first section is adjacent to the last known position and is without an interior structure.

2. The method of claim 1, wherein determining the multiple sections comprises:
comparing the transmission signature to transmission signatures stored in a database for each section of the plurality of sections; and
determining, based on the comparing, multiple sections of the plurality of sections are associated with the plurality of sections.

3. The method of claim 1, wherein each wireless node in the plurality of wireless nodes comprises a directional antenna configured to transmit in a straight beam of a given width.

4. The method of claim 1, further comprising:
transmitting the current position to the portable electronic device.

5. An information processing system for determining a position of a portable electronic device, the information processing system comprising:
at least one processor;
memory coupled to the at least one processor;
a device positioning manager coupled to the at least one processor and the memory, wherein the device positioning manager:
receives a positioning request from a portable electronic device, wherein the positioning request is associated with a defined area comprising a plurality of wireless nodes, each wireless node in the plurality of wireless nodes being situated at a given location within the defined area, wherein the plurality of wireless nodes is arranged in an x-y configuration forming a sparse grid, the sparse grid comprising a plurality of sections where each section is defined by a transmission signature corresponding to a wireless node grouping from the plurality of wireless nodes, and where the positioning request comprises the transmission signature detected by the portable electronic device for at least one section of the plurality of sections;
responsive to determining that the transmission signature within the positioning request is detectable within multiple sections of the plurality of sections, determines that a first section of the multiple sections adjacent to a last known position of the portable electronic device comprises an interior structure and a second section of the multiple sections adjacent to the last known position is without an interior structure; and
selects the first section as a current position of the portable electronic device in response to determining that the first section is adjacent to the last known position and is without an interior structure.

6. The information processing system of claim 5, wherein determining the multiple sections comprises:
comparing the transmission signature to transmission signatures stored in a database for each section of the plurality of sections; and
determining, based on the comparing, multiple sections of the plurality of sections are associated with the plurality of sections.

7. The information processing system of claim 5, wherein each wireless node in the plurality of wireless nodes comprises a directional antenna configured to transmit in a straight beam of a given width.

8. The information processing system of claim 5, wherein the device positioning manager transmits the current position to the portable electronic device.

* * * * *